United States Patent [19]

Takahashi

[11] Patent Number: 5,127,703
[45] Date of Patent: Jul. 7, 1992

[54] FRONT STRUCTURE BETWEEN AN ENGINE COMPARTMENT AND A PASSENGER COMPARTMENT OF A VEHICLE BODY

[75] Inventor: Teruo Takahashi, Isehara, Japan

[73] Assignee: Nissan Motor Co., Ltd., Yokohama, Japan

[21] Appl. No.: 617,171

[22] Filed: Nov. 23, 1990

[30] Foreign Application Priority Data

Nov. 24, 1989 [JP] Japan .................. 1-303278

[51] Int. Cl.$^5$ .................................................. B60R 27/00
[52] U.S. Cl. ........................................ 296/192; 296/194; 296/208; 296/96.17
[58] Field of Search ............ 296/192, 194, 208, 84.1, 296/96.21, 96.17

[56] References Cited

U.S. PATENT DOCUMENTS

| | | | |
|---|---|---|---|
| 3,788,681 | 1/1974 | Barenyi et al. | 296/96.17 X |
| 4,874,198 | 10/1989 | Roller | 296/192 |
| 4,962,961 | 10/1990 | Ito et al. | 296/192 |
| 4,976,491 | 12/1990 | Hashimoto et al. | 296/194 X |
| 4,988,144 | 1/1991 | Johnson et al. | 296/192 |

FOREIGN PATENT DOCUMENTS

| | | | |
|---|---|---|---|
| 2-623455 | 5/1989 | France | 296/192 |
| 11978 | 1/1984 | Japan | 296/192 |
| 265776 | 11/1988 | Japan | 296/192 |
| 2-40382 | 9/1989 | Japan | 296/192 |

OTHER PUBLICATIONS

"Vehicle Dynamics Terminology SAE J670e", Society of Automotive Engineers, Inc., p. 12 (1978).

Primary Examiner—Johnny D. Cherry
Assistant Examiner—Gary C. Hoge
Attorney, Agent, or Firm—Foley & Lardner

[57] ABSTRACT

The front structure comprises a cowl top panel located on the engine compartment side connected to a dash upper panel located on the vehicle cabin side to form a closed box in cross section. A portion of the vertical front wall of the cowl top panel is provided for installation of a motor unit of windshield wiper. This portion is located at a position which does not laterally overlap either vehicle strut housing. The horizontal base of the dash upper panel at the installation portion is at the lowest height of the cowl. A drain hole is provided near this lowest position.

20 Claims, 2 Drawing Sheets

FRONT STRUCTURE BETWEEN AN ENGINE COMPARTMENT AND A PASSENGER COMPARTMENT OF A VEHICLE BODY

BACKGROUND OF THE INVENTION

1. Field of the Invention

The present invention relates to automobile bodies and especially to a front structure disposed between the engine compartment and passenger compartment of a vehicle body.

2. Description of the Related Art

A conventional front structure for separating an engine compartment from a passenger compartment in a vehicle body consists of a cowl having a cowl top panel located on the engine compartment side, and a dash upper panel located on the vehicle cabin side. These panels are connected to form a box which is closed in cross section and supports the vehicle windshield. The upper end of a lower panel is secured to the horizontal base of the dash upper panel to complete the separation of the compartments.

One strut housing is positioned at each side of the engine compartment for supporting and mounting suspension struts. The strut housings are spaced forwardly of a vertical front wall of the cowl top panel. A motor unit of a windshield wiper is mounted on the driver's side of the vertical front wall of the cowl top panel. The portion of the cowl which mounts the motor unit of the windshield wiper is behind the strut housing.

A cowl side panel which closes the side portion of the cowl box has a hole for draining water which has entered the cowl box.

The dash upper panel has a horizontal base provided with an air intake port to introduce air toward a blower unit of an air conditioner.

Recent vehicle design trends call for expanding the vehicle passenger compartment capacity and improving vehicle external appearance. To accommodate these goals, designers try to position the lower end of the windshield as far forward and as low as possible.

It is difficult to move the lower end of the windshield forward using a conventional body front structure because space must be provided between the vertical front wall and the strut housing to accommodate the windshield wiper motor. Also, the motor unit is often mounted rather high on the vertical front wall of the cowl top panel in order to make installation easier and to reduce the space between the vertical front wall and the strut housing. However, this makes the position of the cowl top panel higher, and thus, the lower end of the windshield must be positioned higher, contrary to the desired design.

Furthermore, in the conventional design, the air intake port is located in the lateral side of the horizontal base of the dash upper panel because the blower unit of the air conditioner is mounted in the lateral side of the dash upper panel inside the cabin. This makes the position of the air intake port very close to the drain hole provided in the dash side panel. Accordingly, when, for example, the air intake hole of the cowl top panel is covered by snow, since outside air is drawn through the drain hole of the dash side panel, the water around the drain hole can be drawn into the cabin with the air flow.

SUMMARY OF THE INVENTION

In accordance with the present invention, there is provided a novel front structure for the engine compartment and passenger compartment or cabin of a vehicle body.

The front structure comprises a cowl top panel located on the engine compartment side connected to a dash upper panel located on the vehicle cabin side to form a closed box in cross section. A portion of the vertical front wall of the cowl is provided for installation of a motor unit of a windshield wiper. This portion is located at a position which does not laterally overlap the position of the strut housing. The horizontal base of the upper panel forming the installation portion is at the lowest part of the cowl. A drain hole is provided near this lowest position.

The above structure is effective for solving the above noted problems in a conventional vehicle body.

It is accordingly an object of the present invention to provide a novel front structure for a vehicle body in which the position of the lower end of the windshield can be set more forward and lower than in prior art stuctures.

It is another object of the present invention to provide a novel front structure for a vehicle body which prevents the air conditioner blower unit from drawing water into the passenger compartment from the cowl box.

DETAILED DESCRIPTION OF THE PREFERRED EMBODIMENTS

Figure 1:
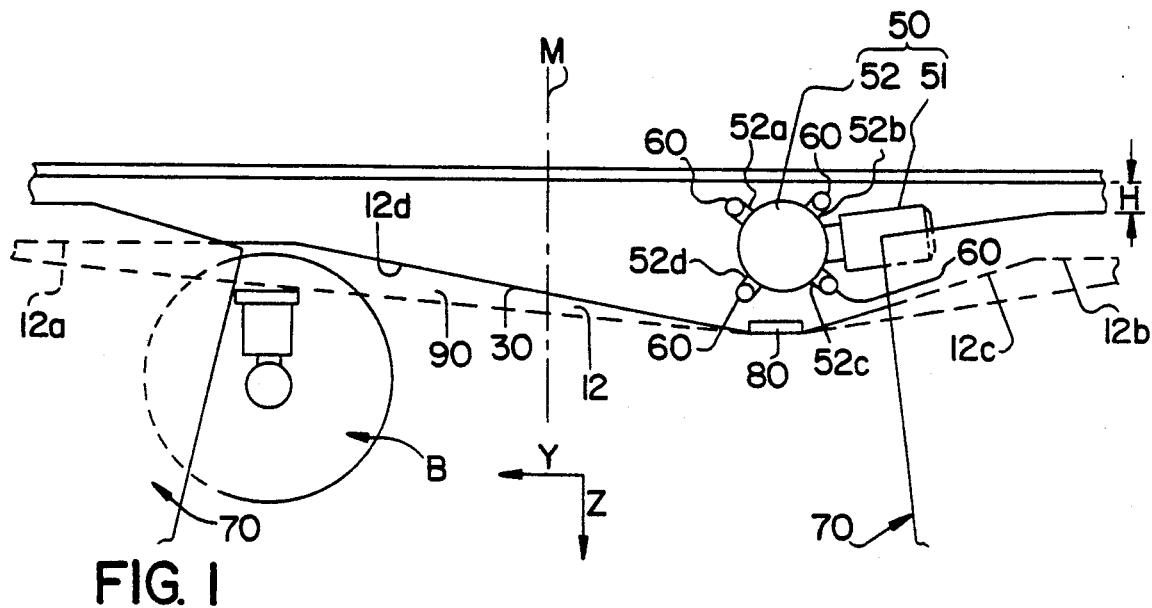
FIG. 1 is a fragmental front view of a front structure for a vehicle body according to an embodiment of the present invention.

Referring to FIGS. 1 to 4, the front structure for separating the engine compartment from the passenger compartment of a vehicle body according to the present invention includes a cowl box 10 which consists of a cowl top panel 20 located on the engine compartment side and a dash upper panel 30 located on the vehicle cabin side. The cowl top panel 20 is approximately L-shaped in cross section and has at the upper and lower ends thereof horizontal flanges 20a and 20b. The dash upper panel 30 is also approximately L-shaped in cross section and has at the upper and lower ends thereof horizontal flanges 30a and 30b. These flanges 20a, 30a and 20b, 30b are secured to each other, respectively, and thusly the cowl top panel 20 and the dash upper panel 30 form the cowl box 10. The lower end of a windshield G is secured on the flange 20b. A dash lower panel 40 having at the upper end thereof a horizontal flange 40a is secured to the flange 30a to complete the separation between the engine compartment and the passenger compartment or cabin. A motor unit 50 of a windshield wiper having a motor section 51 and a gear section 52 has four mounting brackets 52a, 52b, 52c and 52d. The motor unit 50 is mounted on the vertical front wall 20c of the cowl top panel 20 with bolts 60 through brackets 52a to 52d. The mounting portion for the motor unit 50 (in this case, the portion of the cowl where the mounting brackets are positioned) is located between a space S (FIG. 2) in back of a strut housing 70 and a one dot chain line M (FIG. 1) indicating a median plane. The median plane is a vertical plane which passes through the longitudinal x axis or longitudinal center line (shown in FIG. 2) of the vehicle body as well as the vertical z axis (shown in FIG. 1) of the vehicle body. The space S is bounded on the left side by an imaginary first side plane which is parallel to the median plane and which touches an inboard end of the top of the first strut housing 70. The first side plane is shown by a line S1 in FIG. 2. In other words, the mounting portion for the motor unit 50 is at a position where each mounting bracket 52a to 52d does not laterally overlap the strut housing 70.

The horizontal base 30c of the dash upper panel 30 is formed in such a manner that it slopes gradually upward from the position of the mounting portion for the motor unit 50. Accordingly, the height of the horizontal base 30c is lowest at the position corresponding to the mounting portion.

Figure 3:
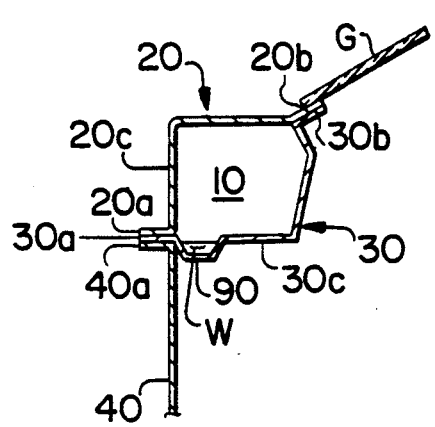
FIG. 3 is a cross section taken on line III—III of FIG. 2.
Figure 4:
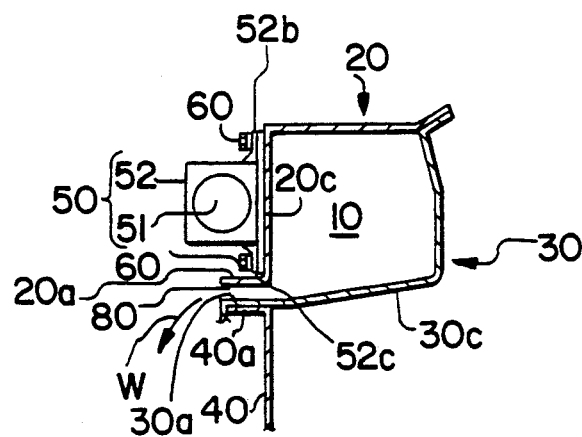
FIG. 4 is a cross section taken on line IV—IV of FIG. 2.

As best shown in FIGS. 1 and 4, a drain hole 80 is provided in the lowest position of the horizontal base 30c. In this embodiment, the drain hole 80 is formed by providing an upward recess in flange 20a at its lowest position and not connecting this portion of flange 20a to flange 30a. As shown in FIG. 3, the horizontal base 30c is formed with a drip channel 90 in the form of a recess for drawing water W toward the drain hole 80. The depth of the drip channel 9 becomes gradually smaller toward the lowest position of the horizontal base 30c. The water W which has gained access to the cowl box 10 flows along the drip channel 90 and is drained through the drain hole 80 to the engine compartment.

Again with reference to FIG. 1, a brake booster B is mounted on the driver's side of the dash lower panel 40. The brake booster B is mounted at a relatively higher position than is conventional because the horizontal base 30c of the dash panel 30 slopes upwardly. The thus-constructed cowl box beam structure is asymmetric as best shown in FIG. 1. The cowl box beam structure extends along the lateral y axis of the vehicle body as shown in FIG. 1 under the windshield G shown in FIG. 3. The cowl box beam structure has a base wall 12 which is formed by the base 30c of the dash upper panel 30. The base wall 12 extends laterally, and has left and right (or first and second) lateral side portions 12a and 12b, an intermediate lowest portion 12c, and left and right (or first and second) sloping portions 12d and 12e, as shown in FIG. 1. The intermediate lowest portion 12c is intermediate between the left and right lateral side portions 12a and 12b. The left sloping portion 12d slopes down from the left lateral side portion 12a to the intermediate lowest portion 12c. The right sloping portion 12e slopes down from the right lateral side portion 12b to the intermediate lowest portion 12c. The intermediate lowest portion 12c is not located at the middle of the base wall 12. The intermediate lowest portion 12c is spaced from the imaginary median plane M which is shown in FIG. 1 and which contains both the vertical z axis shown in FIG. 1, and the longitudinal x axis which shown in FIG. 2. Therefore, the base wall 12 of the box beam structure is asymmetric with respect to the median plane M. The base wall 12 is a lower portion of the cowl box 10 which is designed to lead water, like a gutter, in the cowl box 10 toward the lowest portion 12c.

Figure 2:
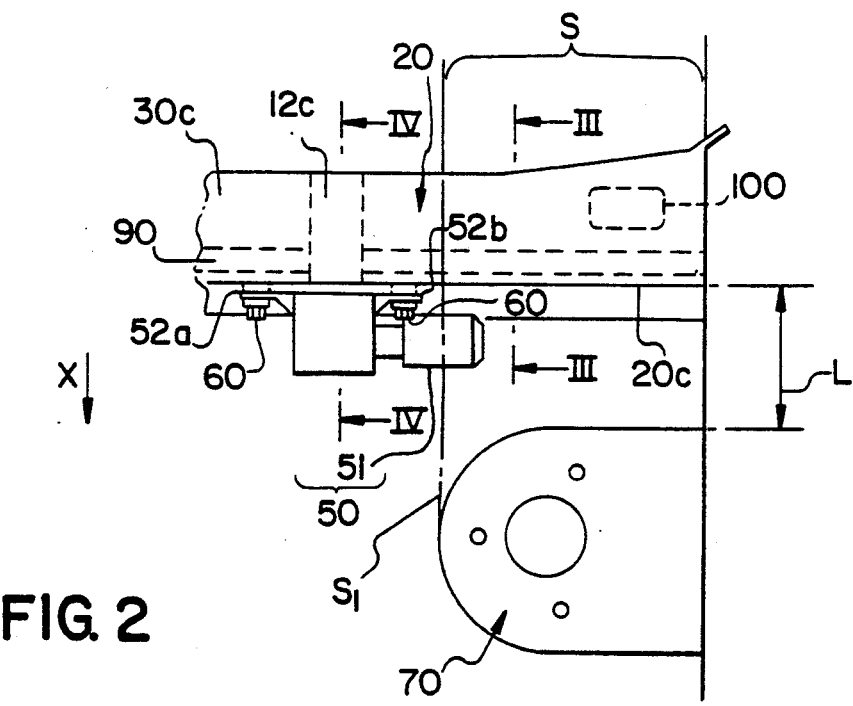
FIG. 2 is a fragmental plan view of a front structure for a vehicle body according to an embodiment of the present invention.

It should be noted that FIGS. 1 and 2 show the positioning of the motor unit 50, drain 80 and brake booster B for a right hand drive vehicle. These positions would be reversed for a left hand drive vehicle.

From the foregoing, it will be understood that since the mounting portion of the motor unit 50 is located so that it does not laterally overlap the strut housing 70, the motor unit 50 can be installed with ease. Thus, it is not necessary to have a large space between the strut housing 70 and the cowl top panel 20 for an efficient installation. In other words, the distance L (FIG. 2) between the cowl top panel 20 and the strut housing 70 can be reduced, and it is also not necessary to set the mounting portion higher for the same reason. Therefore, the height H from the top of the strut housing 70 to cowl top panel 20 can also be reduced.

Thus, according to this structure, the position of the lower end of the windshield can be set further forward and lower than in a conventional front structure for a vehicle body.

It will be further understood that since the drain hole 80 is provided in the lowest position of the horizontal base 30c of the dash upper panel 30 and is relatively far from the air intake port 100 (FIG. 2) located on the lateral side of the horizontal base 30c, a conventionally mounted blower unit in the vehicle is prevented from drawing in the water W in the cowl box 10.

Figure 5:
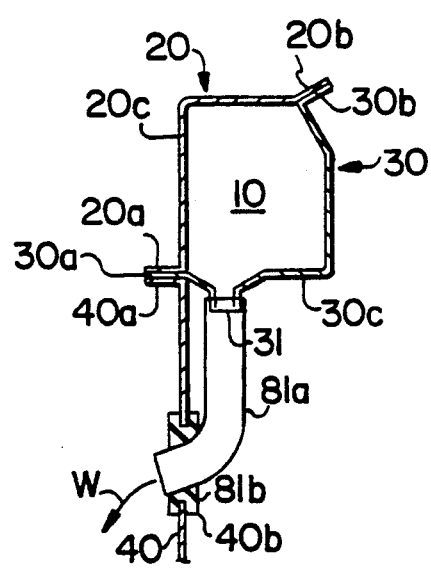
FIGS. 5 and 6 are cross sections which are similar to FIG. 4, but show other embodiments.

FIG. 5 shows a second embodiment of the present invention. In this embodiment, a tubular drain hole 81 is formed by the horizontal base 30c itself at the lowest position thereof. One end of a drain hose 81a is connected to the drain hole 81, and the other end of the drain hose 81a is located inside of the engine compartment penetrating a hole 40b of the dash lower panel 40 through a bush 81b. A one-way valve (not shown) may be provided at the end of the drain hose 81a. That valve prevents the air inside the engine compartment from intruding into the cowl box 1. This structure also provides the same effect as the first embodiment.

Figure 6:
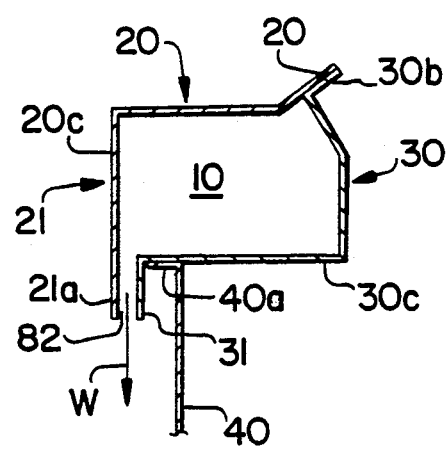

FIG. 6 shows a third embodiment of the present invention. In this embodiment, the cowl top panel 20 is formed with a bulge 21 at a portion corresponding to the lowest position of the dash upper panel 30c. The bulge 21 has a flange 21a extending downwardly, and the horizontal base 30c also has a flange 31 extending downwardly. Thus, flanges 21a and 31 form a drain hole 82. This structure provides the same effect as the first embodiment.

It is to be noted that the invention is not to be limited to the embodiments described above, and that various changes and modifications may be made without departing from the spirit and scope of the invention as defined in the appended claims.

What is claimed is:

1. An apparatus, comprising:
 a vehicle engine compartment;
 a strut housing provided at one lateral side of said vehicle engine compartment;
 a cowl top panel spaced longitudinally behind said strut housing and having a front wall with a mounting portion for a motor unit of a windshield wiper, all of said mounting portion being positioned laterally between said strut housing and a longitudinal center line of the vehicle body;
 a dash upper panel having a horizontal base and forming a cowl box in cross section with said cowl top panel, said horizontal base having a lowest position in the vicinity of said mounting portion; and a drain hole provided near said lowest portion of said horizontal base so that water in said cowl box is drained therefrom.

2. An apparatus as set forth in claim 1 wherein said drain hole comprises a tubular underside of said horizontal base at the lowest position thereof, said drain hole being connected by a drain hose for draining water to the engine compartment.

3. An apparatus as set forth in claim 2, further comprising at the end of said drain hose a one-way valve to prevent air inside the engine compartment from intruding into said cowl box.

4. An apparatus as set forth in claim 2 wherein said horizontal base inclines upwardly from said lowest position.

5. An apparatus as set forth in claim 3 wherein said horizontal base inclines upwardly from said lowest position.

6. An apparatus as set forth in claim 1 wherein said cowl top panel is formed with a bulge at a portion corresponding to said lowest position, said bulge having a flange extending downwardly, and said horizontal base also having a flange extending downwardly for forming said drain hole.

7. An apparatus as set forth in claim 6 wherein said horizontal base inclines upwardly from said lowest position.

8. An apparatus as set forth in claim 1, wherein said horizontal base inclines upwardly from said lowest position.

9. An apparatus as set forth in claim 8 wherein said horizontal base if formed with a channel whereby water inside said cowl box is led to said drain hole.

10. An apparatus as set forth in claim 1, wherein said mounting portion of said front wall is connected to said horizontal base and extends substantially vertically from said horizontal base.

11. An apparatus as set forth in claim 10, wherein said cowl top panel is substantially L-shaped in cross section and has an upper end connected to said dash upper panel and a lower end connected to said horizontal base of said dash upper panel.

12. An apparatus as set forth in claim 10, further comprising a dash lower panel which is connected to said dash upper panel at a position longitudinally aligned with or behind said mounting portion of said cowl top panel.

13. An apparatus, comprising:
a vehicle engine compartment;
a strut housing provided at one side of said vehicle engine compartment;
a cowl top panel spaced behind said strut housing and having a front wall with a mounting portion for a motor unit of a windshield wiper, said mounting portion being positioned laterally between said strut housing and a center line of the vehicle body;
a dash upper panel having a horizontal base and forming a cowl box in cross section with said cowl top panel, said horizontal base having a lowest position in the vicinity of said mounting portion; and
a drain hole provided near said lowest position of said horizontal base so that water in said cowl box is drained therefrom, said drain hole comprising an upward recess in a portion of said front wall corresponding to said lowest position to form an opening to said engine compartment.

14. An apparatus as set forth in claim 13 wherein said horizontal base inclines upwardly from said lowest position.

15. An apparatus, comprising:
a vehicle engine compartment;
a strut housing provided at one side of said vehicle engine compartment;
a cowl top panel spaced behind said strut housing and having a front wall with a mounting portion for a motor unit of a windshield wiper, said mounting portion being positioned laterally between said strut housing and a center line of the vehicle body;
a dash upper panel having a horizontal base and forming a cowl box in cross section with said cowl top panel, said horizontal base having a lowest position in the vicinity of said mounting portion and inclining upwardly from said lowest position; and
a drain hole provided near said lowest position of said horizontal base so that water in said cowl box is drained therefrom, wherein said horizontal base is further provided with a drip channel whereby water inside said cowl box is led to said drain hole, the depth of said drip channel becoming gradually smaller toward said lowest position of said horizontal base.

16. A vehicle body comprising:
a cowl box beam structure which extends across substantially the entire width of a said vehicle body along a lateral y axis of said vehicle body under a windshield and which is asymmetrical about a longitudinal x axis of said vehicle body, said asymmetric box beam structure comprising a base wall which comprises first and second lateral side portions which are spaced from each other along said lateral axis, and an intermediate lowest portion which is located between said first and second side portions and which is formed with a drain hole for draining water from an interior of said cowl box structure, said first and second lateral side portions being spaced laterally from an imaginary median plane which contains both of said longitudinal x axis of said vehicle body and a vertical z axis of said vehicle body, said median plane being located between said first and second side portions, said base wall further comprising a first sloping portion sloping down from said first side portion to said intermediate lowest portion and a second sloping portion sloping down from said second side portion to said intermediate lowest portion, said intermediate lowest portion being spaced from said median plane, so that said box beam structure is asymmetric with respect to said median plane.

17. A vehicle body as set forth in claim 16 wherein said asymmetric cowl box beam structure further comprises a front wall forming a hollow boxlike cross sectional shape of said cowl box structure with said base wall, said front wall comprising a mounting portion for mounting a motor unit of a windshield wiper, said mounting portion of said front wall being located above said intermediate lowest portion between said first and second sloping portions.

18. A vehicle body as set forth in claim 17 wherein said vehicle body further comprises first and second strut housings which are laterally spaced from each other, each of said strut housings comprising a top and extending downwards from said top, said mounting portion being positioned laterally between said top of said first strut housing and said median plane.

19. A vehicle body as set forth in claim 18 wherein said mounting portion is positioned between said median plane and an imaginary first side plane which is parallel to said median plane and intermediate between said mounting portion and said top of said first strut housing, and which touches an inboard end of said top of said first strut housing, said top of said first strut housing being located only on one side of said first side plane, a lateral distance between said median plane and said mounting portion being greater than a lateral distance between said first side plane and said mounting portion, and wherein said front wall is substantially vertical, and said mounting portion of said front wall comprises an upper end which is higher than said top of said first strut housing, and a lower end which is lower than said top of said first strut housing.

20. A vehicle body as set forth in claim 19 wherein said asymmetric cowl box structure comprises a cowl top panel and a dash upper panel which are joined together to form a laterally extending hollow box beam, said cowl top panel forming said front wall, and said dash upper panel forming said base wall.

* * * * *